(12) United States Patent
Yan et al.

(10) Patent No.: US 8,782,916 B2
(45) Date of Patent: Jul. 22, 2014

(54) SUPPORTING PLATE STRUCTURE FOR MAGNETOSCALE

(75) Inventors: Liqing Yan, Guangzhou (CN); Qiang Huang, Guangzhou (CN); Ziming Gu, Guangzhou (CN)

(73) Assignee: Guangzhou Lokshun CNC Equipment Ltd, Guangzhou (CN)

( * ) Notice: Subject to any disclaimer, the term of this patent is extended or adjusted under 35 U.S.C. 154(b) by 0 days.

(21) Appl. No.: 13/266,111

(22) PCT Filed: Feb. 23, 2010

(86) PCT No.: PCT/CN2010/070712
§ 371 (c)(1),
(2), (4) Date: Oct. 24, 2011

(87) PCT Pub. No.: WO2010/121507
PCT Pub. Date: Oct. 28, 2010

(65) Prior Publication Data
US 2012/0043441 A1 Feb. 23, 2012

(30) Foreign Application Priority Data
Apr. 24, 2009 (CN) .......................... 2009 1 0038964

(51) Int. Cl.
*G01B 7/00* (2006.01)
(52) U.S. Cl.
USPC ............................................ 33/708; 33/700
(58) Field of Classification Search
USPC ................. 248/222, 14; 33/700, 702, 708
See application file for complete search history.

(56) References Cited

U.S. PATENT DOCUMENTS 4,649,648 A    3/1987  Nagaoka
(Continued)

FOREIGN PATENT DOCUMENTS

CN    100404198 C    7/2008
CN    100404199 C    7/2008
(Continued)

OTHER PUBLICATIONS

PCT International Search Report in corresponding International application No. PCT/CN2010/070712, published Oct. 28, 2010.

*Primary Examiner* — Todd M Epps
(74) *Attorney, Agent, or Firm* — Davis Wright Tremaine LLP

(57) ABSTRACT

The invention provides a supporting plate structure for a magnet grid ruler, including a plurality of pieces of supporting plates and at least two sections of ruler shells within which magnetic strips are provided, both ends of each section of the ruler shells are fixedly mounted on two pieces of the supporting plates respectively, and the respective pieces of supporting plates are mounted at one side of a machine guide rail pair. A magnet grid reading head is mounted at the other side of the machine guide rail pair, and is moved with respect to magnetic strips. In the invention, the supporting plate structure is designed to be a structure with a plurality of pieces, each has a smaller size, thus the supporting plates do not need to be calibrated exactly, and thus time and work are saved. Also, the supporting plates have no twisting and bending, so as to ensure the straightness of the ruler shells and magnetic strips, which are mounted on the supporting plates, thereby improving parallelism between the magnetic strips and the magnetic grid reading head and improving the measurement accuracy of the magnetic grid.

8 Claims, 2 Drawing Sheets

(56) References Cited

U.S. PATENT DOCUMENTS

| | | |
|---|---|---|
| 4,843,729 A | 7/1989 | Nagaoka |
| 4,991,311 A * | 2/1991 | Nagaoka et al. ............... 33/708 |
| 5,016,359 A * | 5/1991 | Nagaoka et al. ............... 33/702 |
| 6,119,357 A | 9/2000 | Ochiai |
| 6,931,741 B2 | 8/2005 | Nakamura |
| 2005/0206372 A1 | 9/2005 | Ratnaparkhi |
| 2010/0162582 A1 * | 7/2010 | Shiao et al. ..................... 33/708 |

FOREIGN PATENT DOCUMENTS

| | | |
|---|---|---|
| CN | 101498574 A | 8/2009 |
| CN | 201392175 Y | 1/2010 |
| CN | 201425466 Y | 3/2010 |

* cited by examiner

SUPPORTING PLATE STRUCTURE FOR MAGNETOSCALE

CROSS-REFERENCE TO RELATED APPLICATIONS

The present application is a U.S. National Stage entry under 35 U.S.C. §371 of International Application No. PCT/CN2010/070712 filed on Feb. 23, 2010 designating the United States of America, which in turn claims priority to Chinese Patent Application No. 200910038964.4 filed on Apr. 24, 2009, each of which is hereby incorporated by reference in its entirety.

TECHNICAL FILED

The present invention relates to a filed of measurement of magnetic signals, and more particularly, to supporting plate structure for a magnet grid ruler.

BACKGROUND ART

A magnetic grid is a device for detecting a displacement using electromagnetic characteristic and principles of magnetic recording, and generally includes three parts: a magnet grid ruler, a magnet grid reading head and a detecting circuit. Square wave or sine wave signals recorded by a magnetic head are stored within the magnet grid ruler. When detecting, the magnet grid reading head reads out the square wave or sine wave electromagnetic signals in the magnet grid ruler and converts these signals into electrical signals, and then displacement detection is achieved according to the electrical signals.

In existing magnet grid ruler supporting plate structure for supporting the magnet grid ruler, the supporting plate is generally a long integral strip, wherein the supporting plate is mounted at one side of a machine guide rail pair, and a ruler shell is mounted onto the supporting plate, and magnetic strips are provided within the ruler shell. The magnet grid reading head is mounted at the other side of the machine guide rail pair, and the magnet grid reading head and the magnetic strips are moved relative to each other. Since the magnetic grid belongs to a more precise measuring tool, the gap and parallelism between the magnetic strips and the magnet grid reading head have to be exactly assured in order to make sure measuring precision of the magnet grid. For a long supporting plate in a form of an integral strip, however, its straightness is hard to be assured even though calibration is performed. From a microcosmic view, a long supporting plate is twisted and bent, thus it is difficult to assure straightness of the ruler shell and the magnetic strips, thereby being hard to make sure the magnetic strips are parallel with the magnet grid reading head and then resulting in poor measuring accuracy of the magnet grid.

SUMMARY OF THE INVENTION

The invention has been made in order to overcome the above disadvantages in the prior art, and it is an object of the invention to provide a supporting plate structure for a magnet grid ruler having a reasonable configuration and higher straightness and parallelism.

The object of the invention is achieved by a supporting plate structure for a magnet grid ruler, including a plurality of pieces of supporting plates and at least two sections of ruler shells within which magnetic strips are provided, both ends of each section of the ruler shells are fixedly mounted on two pieces of the supporting plates respectively, and the respective pieces of supporting plates are mounted at one side of a machine guide rail pair.

Preferably, an upper portion of each piece of the supporting plates is provided with three holes, a lower portion of each piece of the supporting plates is provided with two holes, and each hole is fitted with a fastening bolt for adjusting. Adjusting operations of the fastening bolts are used to make sure that a ruler shell mounting base face of each piece of the supporting plate is parallel with the rail pair.

Preferably, a middle position of the ruler shell is fixedly connected with a piece of supporting plate, so that the it is better to make sure that the ruler shell mounting base face of each piece of the supporting plate is parallel with the rail pair.

Preferably, the ruler shells are connected to the supporting plates by means of countersunk head hexagon screws.

Preferably, the supporting plates are fixed at one side of the machine guide rail pair by means of countersunk head hexagon screws.

Preferably, the lower portion of each piece of the supporting plates is provided with a protruding for positioning the ruler shell.

Preferably, each piece of the supporting plates has a length of 118 mm, a width of 80 mm and a thickness of 16 mm.

Preferably, the supporting plates and the ruler shells are aligned with each other at outside of two ends of the magnetic grid ruler.

Preferably, the supporting plates are made of steel or aluminum alloy material.

Compared to the prior art, in the supporting plate structure for a magnet grid ruler according to the invention, the plurality of pieces of supporting plates are mounted at one side of the machine guide rail pair, the magnet grid reading head is mounted at the other side of the machine guide rail pair, and the magnet grid reading head is moved with respect to the magnetic strips. In the supporting plate structure for a magnet grid ruler, the supporting plate structure is designed to be a structure with a plurality of pieces, each has a smaller size, thus the supporting plate does not need to be calibrated exactly, and thus time and work are saved. Also, the supporting plates have no twisting and bending, so as to ensure the straightness of the ruler shells and magnetic strips, which are mounted on the supporting plates, thereby improving parallelism between the magnetic strips and the magnet grid reading head and improving the measurement accuracy of the magnetic grid.

DETAIL DESCRIPTION OF ILLUSTRATION EMBODIMENTS

In the following, the invention will be described in detail with reference to the drawings and embodiments.

Example 1

Figure 1:
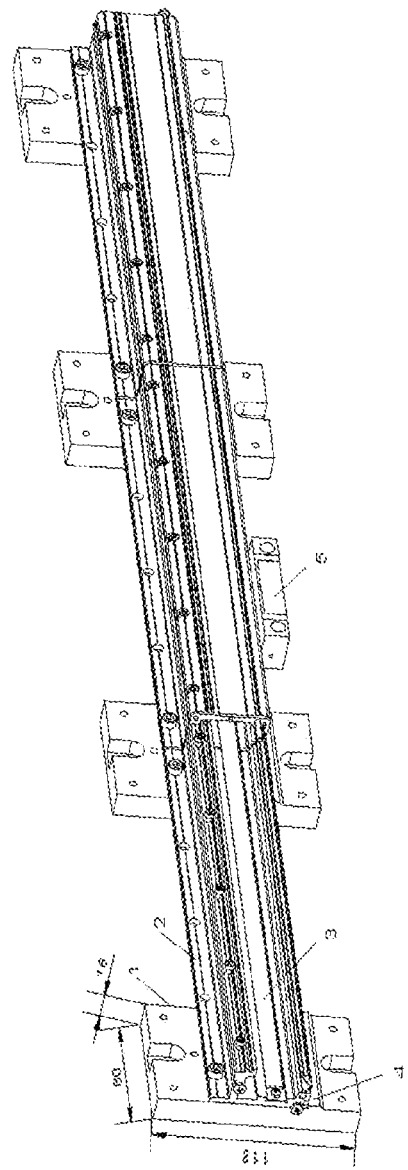
FIG. 1 is a structure view of a supporting plate structure for a magnet grid ruler according to the invention.

As shown in FIG. 1, a supporting plate structure for a magnet grid ruler includes four pieces of supporting plates 1 and three sections of ruler shells 2 within which magnetic strips 3 are provided, both ends of each section of ruler shells 2 are fixedly mounted on two pieces of supporting plates 1 respectively, and the respective pieces of supporting plates 1 are mounted at one side of a machine guide rail pair (not shown). An upper portion of each piece of the supporting plate 1 is provided with three holes 6, and a lower portion of each piece of the supporting plates 1 is provided with two holes 6, the five holes 6 are fitted with fastening bolts for adjusting. (Adjusting operations of the fastening bolts are used to make sure that a ruler shell mounting base face 7 of each piece of the supporting plate 1 is parallel with the rail pair.) The ruler shells 2 are connected to the supporting plates 1 by means of countersunk head hexagon screws. The supporting plates 1 are fixed at one side of the machine guide rail pair (not shown) by means of hexagon screws.

Figure 2:
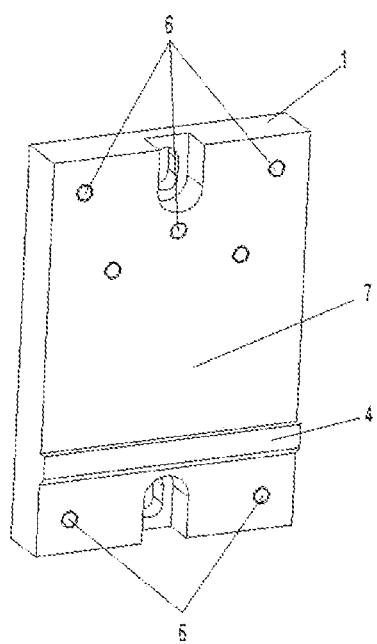
FIG. 2 is a structure view of a supporting plate of the supporting plate structure for a magnet grid ruler of FIG. 1.

As shown in FIG. 2, the lower portion of each piece of the supporting plates 1 is provided with a protruding 4 for positioning the ruler shells 2. Each piece of the supporting plates 1 has a length of 118 mm, a width of 80 mm and a thickness of 16 mm. The supporting plates 1 and the ruler shells 2 are aligned with each other at ends of the magnetic grid ruler. The supporting plates 1 are made of steel or aluminum alloy material.

The above supporting plate structure has the following advantages: the plurality of pieces of supporting plates 1 are mounted at one side of the machine guide rail pair, a magnet grid reading head 5 is mounted at the other side of the machine guide rail pair, and the magnet grid reading head 5 is moved with respect to magnetic strips 3. In the supporting plate structure for a magnet grid ruler, the supporting plate structure is designed to be a structure with a plurality of pieces, each has a smaller size, thus the supporting plates 1 do not need to be calibrated exactly, and thus time and work are saved. Also, the supporting plates have no twisting and bending, so as to ensure the straightness of the ruler shells 2 and magnetic strips 3, which are mounted on the supporting plates 1, thereby improving parallelism between the magnetic strips 3 and the magnetic grid reading head 5 and improving the measurement accuracy of the magnetic grid.

Example 2

The present example is the same as the example 1, except the following features: a middle position of the ruler shell 2 is fixedly connected with a piece of supporting plate 1 when the ruler shell 2 is longer, so that it is better to make sure that the ruler shell mounting base face 7 of each piece of the supporting plates 1 is parallel with the rail pair.

The above embodiments are preferred embodiments of the invention and could not be interpreted to be limitative to claims of the invention, and those skilled in the art will recognize that any changes or other equivalents, which are made without departing from the solutions of the invention, are included within scopes of the invention.

What is claimed is:

1. A supporting plate structure for a magnet grid ruler, comprising a plurality of pieces of supporting plates and at least two sections of ruler shells within which magnetic strips are provided, wherein both ends of each section of the ruler shells are fixedly mounted on two pieces of the supporting plates respectively, wherein the respective pieces of supporting plates are mounted at one side of a machine guide rail pair, wherein each piece of the supporting plate comprises a ruler shell mounting base face, wherein the ruler shell mounting base face is flat and parallel with the machine guide rail pair, and wherein a lower portion of each piece of the supporting plates is provided with a protruding extending from one end of the supporting plate to the other end for contacting and positioning two neighboring ruler shells.

2. The supporting plate structure for a magnet grid ruler according to claim 1, wherein an upper portion of each piece of the supporting plates is provided with three holes, a lower portion of each piece of the supporting plates is provided with two holes, and each hole is fitted with a fastening bolt for adjusting.

3. The supporting plate structure for a magnet grid ruler according to claim 1, wherein a middle position of the ruler shell is fixedly connected with a piece of supporting plate.

4. The supporting plate structure for a magnet grid ruler according to claim 1, wherein the ruler shells are connected to the supporting plates by a countersunk head hexagon screws.

5. The supporting plate structure for a magnet grid ruler according to claim 1, wherein the supporting plates are fixed at one side of the machine guide rail pair by a countersunk head hexagon screws.

6. The supporting plate structure for a magnet grid ruler according to claim 1, wherein each piece of the supporting plates has a length of 118 mm, a width of 80 mm and a thickness of 16 mm.

7. The supporting plate structure for a magnet grid ruler according to claim 1, wherein the supporting plates and the ruler shells are aligned with each other at ends of the magnetic grid ruler.

8. The supporting plate structure for a magnet grid ruler according to claim 1, wherein the supporting plates are made of steel or aluminum alloy material.

\* \* \* \* \*